United States Patent
Few et al.

(10) Patent No.: US 6,932,388 B2
(45) Date of Patent: Aug. 23, 2005

(54) TRAILER FRAME

(75) Inventors: Jeffrey P. Few, Elkhart, IN (US); Bernard F. Garceau, Granger, IN (US)

(73) Assignee: Norco Industries, Inc., Elkhart, IN (US)

( * ) Notice: Subject to any disclaimer, the term of this patent is extended or adjusted under 35 U.S.C. 154(b) by 283 days.

(21) Appl. No.: 10/045,365

(22) Filed: Nov. 7, 2001

(65) Prior Publication Data

US 2002/0063422 A1 May 30, 2002

Related U.S. Application Data (60) Provisional application No. 60/246,813, filed on Nov. 8, 2000.

(51) Int. Cl.$^7$ .............................................. B62D 24/00
(52) U.S. Cl. ..................................... 280/787; 280/789
(58) Field of Search ............................... 280/781, 785, 280/789, 788, 800, 795, 797, 124.13, 124.128, 124.166, 124.109, 124.153, 124.175, 787, 124.169, 124.17, 682

(56) References Cited

U.S. PATENT DOCUMENTS

| | | |
|---|---|---|
| 3,540,756 A | 11/1970 | Stout et al. |
| 3,891,231 A | 6/1975 | Snoberger et al. |
| 4,753,450 A | 6/1988 | Wibben |
| 4,966,386 A | 10/1990 | Werdich |
| 5,326,128 A * | 7/1994 | Cromley, Jr. ................ 280/656 |
| 5,378,006 A * | 1/1995 | Stuart et al. .............. 280/149.2 |
| 5,380,028 A * | 1/1995 | Ferris et al. .............. 280/405.1 |
| 5,599,038 A * | 2/1997 | German ................ 280/124.175 |
| 5,836,606 A | 11/1998 | Spoto et al. |
| 6,092,819 A * | 7/2000 | Overby et al. ......... 280/124.153 |
| 6,398,261 B1 * | 6/2002 | Ammer et al. .............. 280/781 |
| 6,485,054 B1 * | 11/2002 | Yurgevich .................... 280/789 |
| 6,652,020 B2 * | 11/2003 | Few ........................... 296/204 |
| 6,692,014 B1 * | 2/2004 | Grosso et al. ............ 280/491.1 |
| 6,708,988 B2 * | 3/2004 | Dunlap et al. ............ 280/6.157 |

FOREIGN PATENT DOCUMENTS

| | | |
|---|---|---|
| GB | 323537 | 1/1930 |
| GB | 1552443 | 9/1979 |
| GB | 1562883 | 3/1980 |
| GB | 2044193 A | 10/1980 |

* cited by examiner

*Primary Examiner*—Paul N. Dickson
*Assistant Examiner*—Toan To
(74) *Attorney, Agent, or Firm*—Hahn Loeser & Parks LLP; Michael H. Minns (57) ABSTRACT

A bolt-together trailer frame that can have either a torsion axle or a sprung axle attached thereto without modification of the trailer frame side members. The side frame of the trailer includes at least one axle cut-out with an axle cut-out reinforcement plate attached about the cut-out. A torsion axle is welded to the axle cut-out reinforcement plates. A sprung axle is attached to the trailer frame with a plurality of spring hangers to which leaf springs are connected. The axle of the sprung axle is then attached to the spring hangers.

42 Claims, 9 Drawing Sheets

TRAILER FRAME

This application claims the benefit of U.S. Provisional application No. 60/246,813 filed Nov. 8, 2000. Application Ser. No. 60/246,813 is hereby incorporated by reference.

BACKGROUND OF THE INVENTION

This invention relates generally to trailer frames and more particularly to bolt-together trailer frames.

Typically trailer frames are manufactured by welding frame members together. Typical frame members include flat, L-shaped or U-shaped metal rail sections or tube sections. Frequently, spring hangers are welded directly to the rail or tube sections for sprung axle units. An axle tube of a torsion axle can also be directly welded to the rail or tube sections or can be attached using shackles. These trailer frames are used for boat trailers, recreational vehicles, horse trailers, utility trailers, etc.

One problem with welded trailer frames is shipping the completed frame. Because the entire frame including axles is pre-assembled, only a few assembled frames can be shipped at a time. Another problem is inventory. If a recreational vehicle manufacturer uses both torsion axle frames and sprung axle frames or uses multiple size frames, the manufacturer must stock all the various combinations as fully assembled trailer frames, which increases required stock and storage space for stock.

The foregoing illustrates limitations known to exist in present trailer frames. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an improvement for a bolt-together trailer frame having a plurality of frame members bolted together, wherein the improvement comprises: at least two axle frame members, each axle frame member having at least one axle cut-out in a lower portion thereof; at least one cutout reinforcing member about the at least one axle cut-out; and at least one axle member, the at least one axle member comprising one of: at least one torsion axle integral with two cut-out reinforcing members; and at least one sprung axle unit, each sprung axle unit comprising: a plurality of spring hangers attached to the at least one axle frame member; leaf springs attached to the spring hangers; and an axle attached to the leaf springs.

In another aspect of the present invention, this is accomplished by providing a method of assembling a bolt-together trailer frame comprising: providing a plurality of frame members including at least two axle frame members, each axle frame member having at least one axle cut-out therein; fastening the plurality of frame members together with a plurality of threaded connectors; fastening an axle cut-out reinforcing member about each axle cut-out; and attaching at least torsion axle or sprung axle to the axle frame members.

In another aspect of the present invention, this is accomplished by adding a sprung axle support box to a bolt together trailer frame. The support box consists of stiffeners plates added to the trailer axle frame members adjacent to the sprung axle along with cross members connected to the axle frame members just in front of and behind the sprung axle spring hangers.

The foregoing and other aspects will become apparent from the following detailed description of the invention when considered in conjunction with the accompanying drawing figures.

DETAILED DESCRIPTION

The FIGURES show a bolt-together trailer frame 10 that can accept either a torsion axle 40 or a sprung axle 30 without modification of the trailer frame side members. This allows a trailer manufacturer or a recreational vehicle manufacturer to reduce parts inventory. The manufacturer no longer has to stock fully assembled trailer frames with both torsion axles and sprung axles. The appropriate axle unit can be added at the time the frame 10 is assembled.

Figure 1:
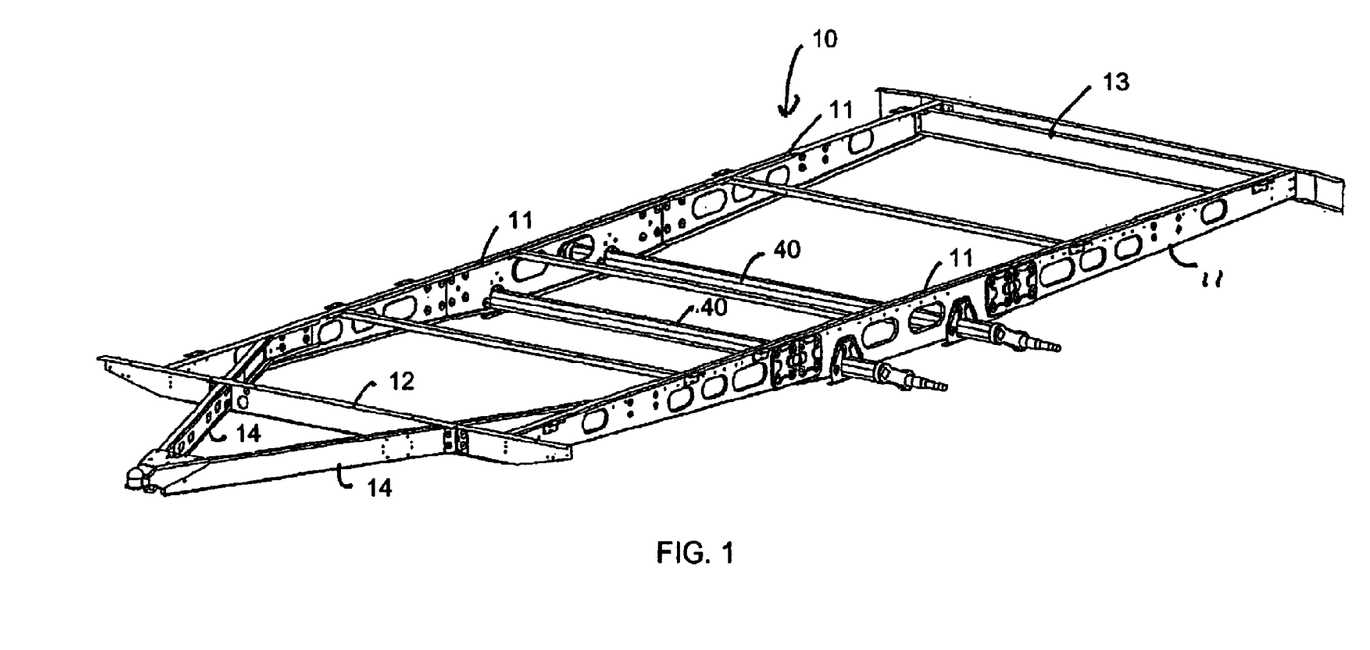
FIG. 1 shows a perspective view of a double axle bolt-together trailer frame according to the present invention with double torsion axles.
Figure 2:
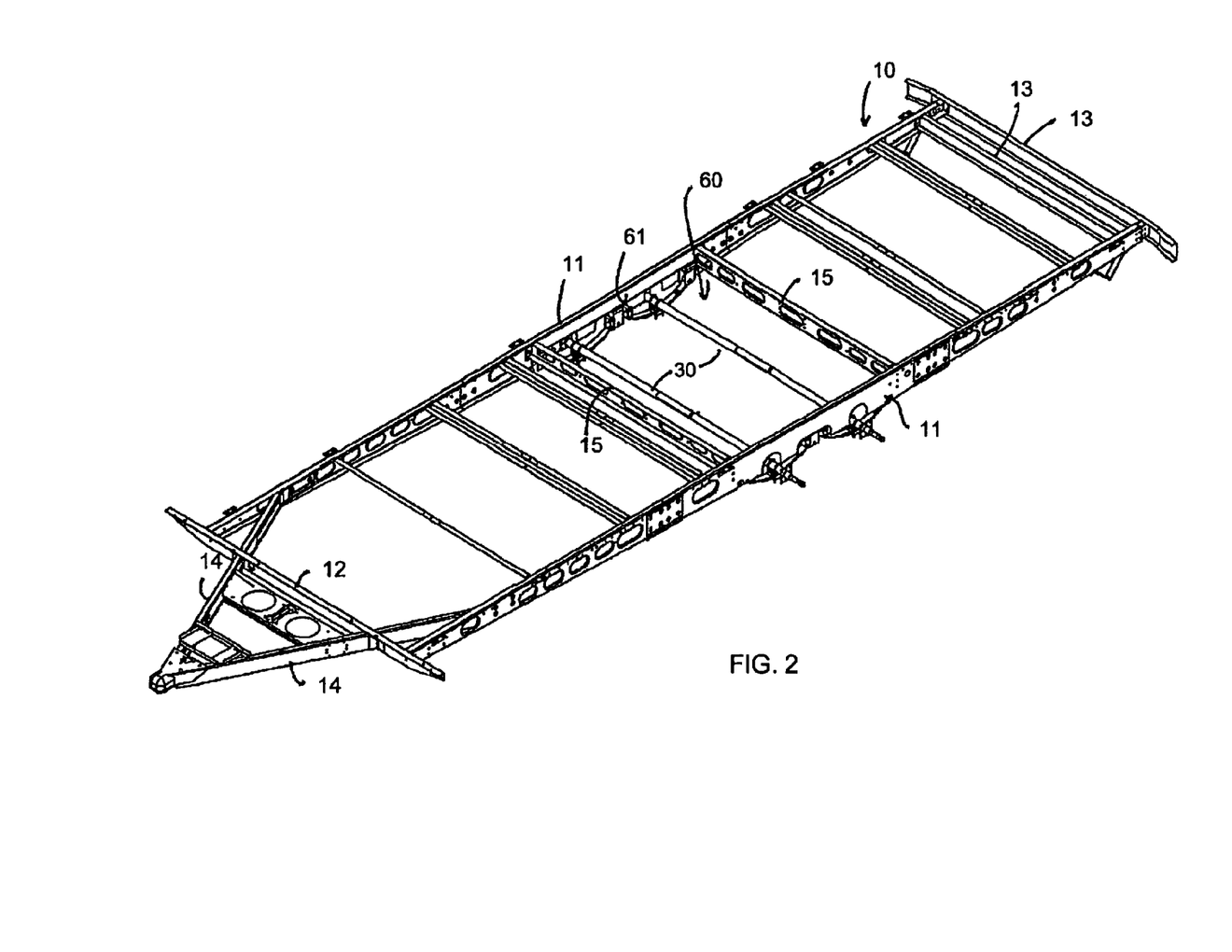
FIG. 2 shows a perspective view of a second embodiment of a double axle bolt-together trailer frame with double sprung axles.

The trailer frame 10 shown in FIG. 1 can be used for both torsion axles and sprung axles. Although, the trailer frame 10 shown in FIG. 2 is primarily intended for use with sprung axles, it could be used with torsion axles.

The bolt-together trailer frame 10 is assembled from a plurality of frame members 11, front cross member 12, rear cross member 13 and A frame or trailer tongue members 14 that are bolted together with a plurality of threaded fasteners.

Additional floor supports or outriggers are added as needed for the particular end product. A rear bumper can be used in addition to the rear cross member 13 as shown in FIG. 1 or the rear cross member 13 can also function as a rear bumper as shown in FIG. 2.

FIG. 1 shows a bolt-together trailer frame 10 with two torsion axles 40. FIG. 2 shows the bolt-together trailer frame 10 with two sprung axle units 30. Preferably, when sprung axle units 30 are used, the trailer frame 10 includes a plurality of laterally extending cross supports 15. In the preferred embodiment, the laterally extending cross supports 15 extend from one side frame member 11 to the other side frame member 11. Alternatively, the cross supports 15 could extend only partially towards the opposite side frame member. Preferably, such part length supports 15 are fastened to a floor (not shown) that is attached to the top surface of trailer frame 10.

Figure 3:
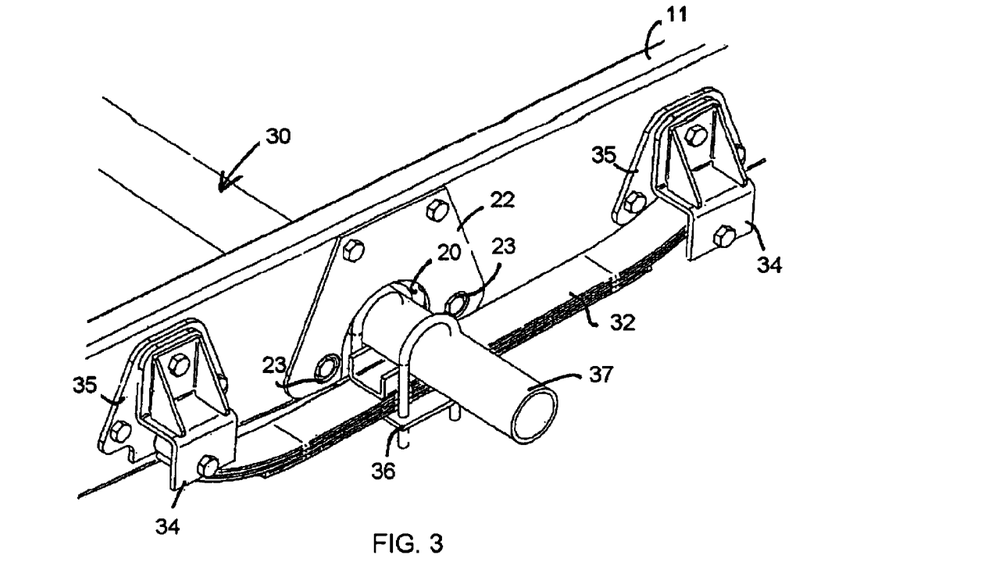
FIG. 3 is an enlarged view of a section of the first embodiment of a bolt-together trailer frame illustrating details of a single axle trailer frame and single sprung axle.
Figure 4:
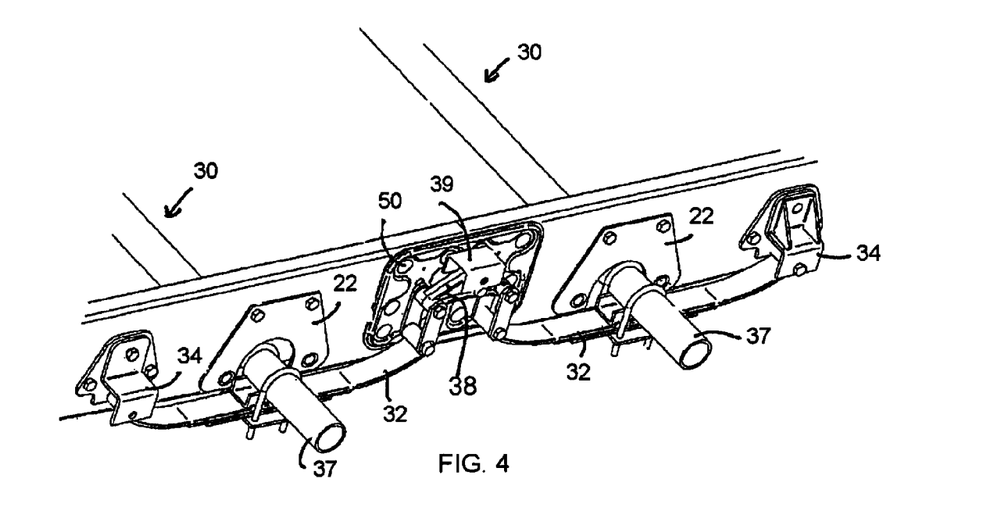
FIG. 4 is an enlarged view of a section of the first embodiment of a bolt-together trailer frame illustrating details of a double axle trailer frame and double sprung axles.
Figure 5:
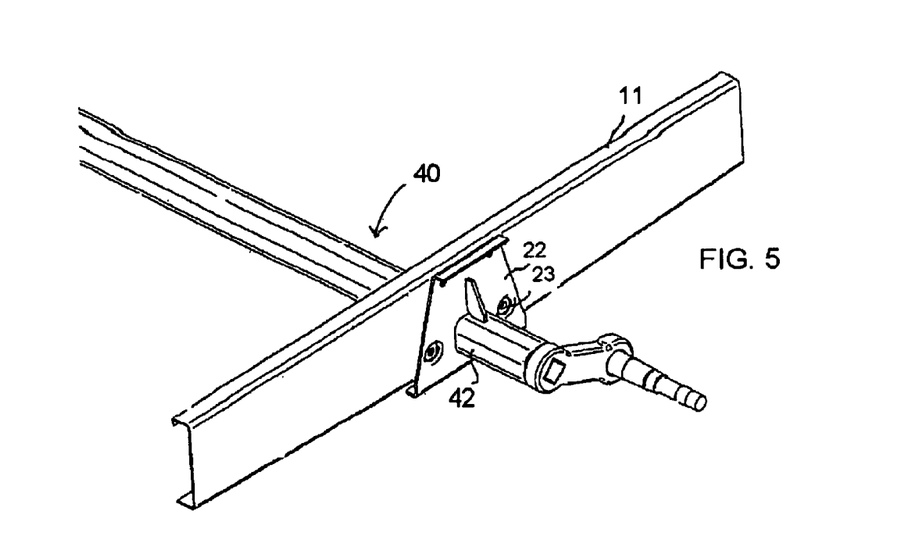
FIG. 5 is an enlarged view of a section of the first embodiment of a bolt-together trailer frame illustrating details of a single axle trailer frame and single torsion axle.
Figure 6:
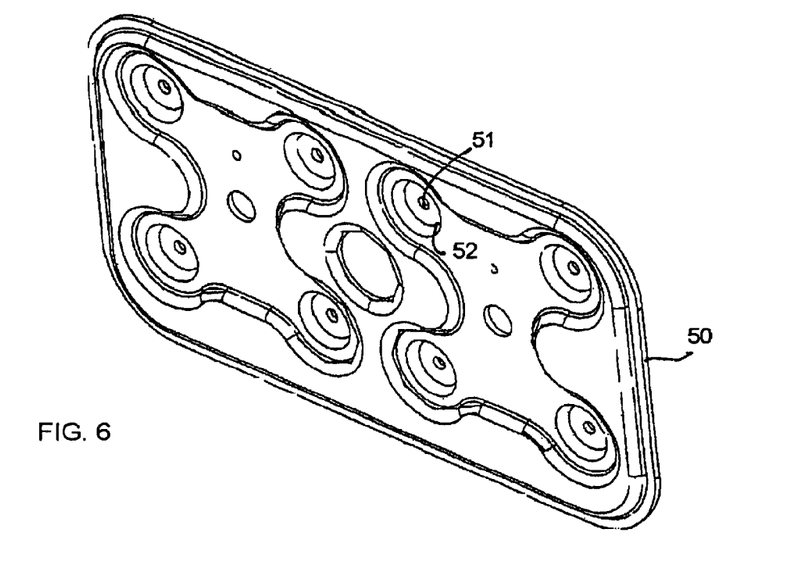
FIG. 6 is a perspective view of a reinforcement bracket for use with a bolt-together trailer frame.
Figure 7:
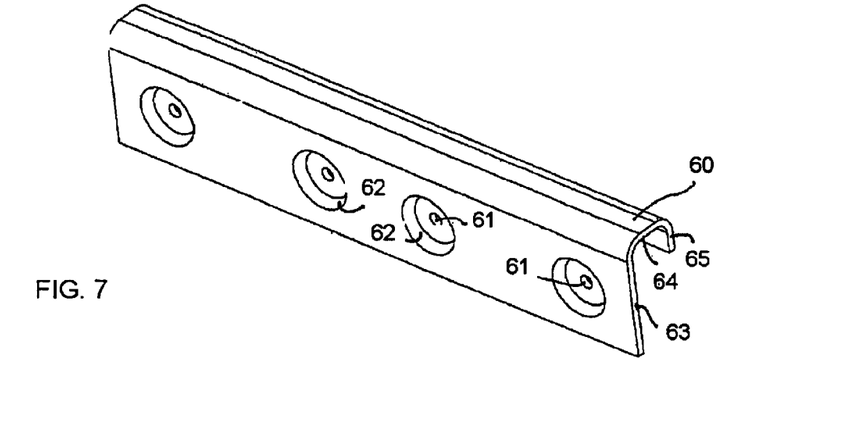
FIG. 7 is a perspective view of a second reinforcement bracket for use with a bolt together trailer frame.

FIGS. 3, 4 and 5 show enlarged views of the side frame members 11 illustrating the axle attachments to the trailer frame 10. FIGS. 3 and 4 show a single sprung axle and double sprung axle, respectively. FIG. 5 shows a single torsion axle frame. Preferably, the side frame members 11 for both a torsion axle 40 and a sprung axle unit 30 are the same. The side frame member 11 includes at least one axle cut-out 20 (best shown in FIGS. 8 through 10), which allows clearance for the axle. The axle cut-out 20 can be reinforced on the inside with a laterally extending flange or eyebrow 21. A plurality of through apertures or bolt holes 25 are provided about the axle cut-out 20. Some of the apertures 25 are provided with dimples 24 about the apertures. In one embodiment a cut-out reinforcing member or plate 22 is fastened about the axle cut-out 20 to the axle frame member 11 with a plurality of threaded fasteners. The cut-out reinforcing plate 22 includes corresponding dimples 23 that nest in the cut-out dimples 24 to strengthen the connection of plate 22 to axle frame member 11 and to increase twisting or torque resistance.

For attaching a sprung axle unit 30, as shown in FIGS. 3 and 4, spring hangers 34, 38 are attached to the side frame member 11, preferably using threaded fasteners. A reinforcing member 35, 50 is normally provided between the spring hangers 34, 28 and the side frame member 11. For a single sprung axle unit 30, two spring hangers 34 are attached to the side frame member 11 with a flat gusset 35 between the spring hanger 34 and the side frame member 11. The gusset 35 may be welded or bolted to the side frame member 11. The gusset 35 provides additional reinforcement of the side frame member 11. A plurality of leaf springs 32 are attached to the two spring hangers 34. An axle tube 37 is attached to the leaf springs 32 by shackles 36. The spring hangers 34, leaf springs 32 and attached axle tube 37 form a sprung axle unit 30. A wheel, tire and wheel bearing and brake unit as needed (not shown) are attached to the end of the axle tube 37.

The attachment of double sprung axle units 30 is similar to the attachment of a single sprung axle unit 30. Spring hangers 34 are used at the outboard ends of the two sprung axle units 30. A pivotable equalizer 38 is used in the center to hang the inboard ends of the leaf springs 32. The pivotable equalizer 38 is attached to the side frame member 11 with an equalizer hanger 39. A reinforcement plate can be used between the equalizer hanger 39 and the side frame member 11. A fish plate or connector reinforcing member 50 is shown in FIG. 4. This type of plate is used when the pivotable equalizer 38 is attached where two side frame members 11 are bolted together. If the double sprung axle units 30 are attached to a single side frame member 11, a more simple plate similar to gusset 35 can be used.

As shown in FIG. 5, for attaching a torsion axle 40 to trailer frame 10, an outer torsion axle tube 42 is attached to cut-out reinforcing member 22, preferably by welding. The cut-out reinforcing plate 22 is attached to the side frame member 11 by bolts or threaded fasteners.

Figure 8:
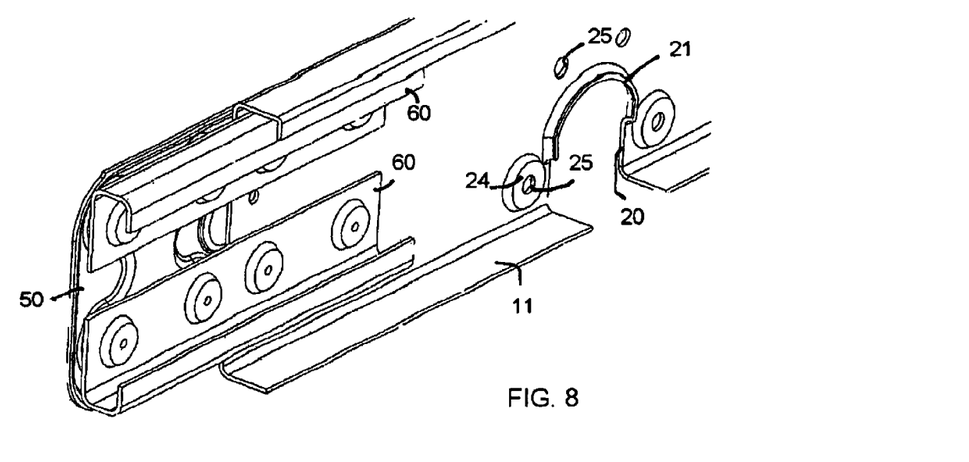
FIG. 8 is an inside perspective view illustrating the connection of two frame members with the reinforcement brackets shown in figures, only one frame member being shown for clarity.
Figure 9:
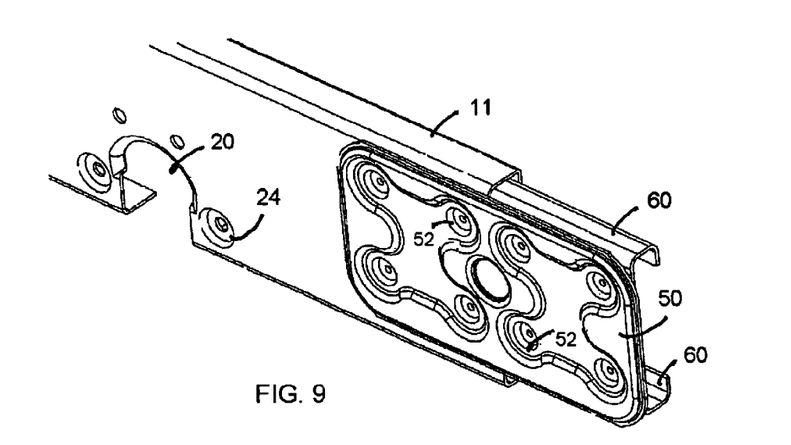
FIG. 9 is an outside perspective view of the connection of the two frame members shown in FIG. 8.
Figure 10:
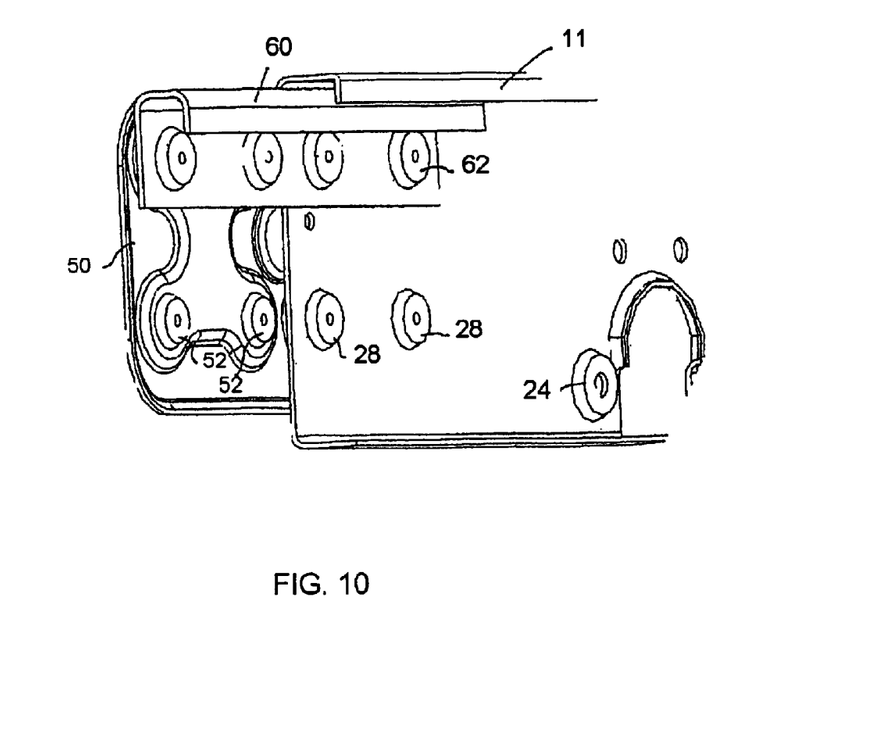
FIG. 10 is a second inside perspective of the connection of two frame members shown in FIG. 8 with one inside reinforcement bracket being removed for clarity.

When double axles are attached to two connected side frame members 11, as shown in FIG. 4, connector reinforcement plates 50, 60 are used to reinforce and stiffen the connection of the two side frame members 11. FIGS. 8 through 10 show the details of these connector reinforcement plates 50, 60. A generally flat plate 50, known as a fish plate, is used on the outside of the trailer frame 10. The fish plate 50 includes a plurality of dimples 52 positioned about a plurality of bolt holes 51. The ends of side frame member 11 contain a corresponding plurality of dimples 28 (shown in FIG. 10), also positioned about a plurality of bolt holes. Two connector reinforcing plates 60, known as J brackets, are fastened on the inside of the trailer frame. The J brackets include a corresponding plurality of dimples 62 positioned about a plurality of bolt holes 61. Each J bracket 60 includes a major section 63 that fits against the inside surface of side frame member 11, an inwardly extending lateral section 64 and a return section 65 extending from the lateral section 64. The J bracket 60 includes the lateral section and the return section to stiffen the J bracket. When the fish plate 50, the two side frame members 11 and the two J brackets 60 are assembled together, dimples 52, 28 and 62 nest together to further stiffen and reinforce the connection of the two side frame members 11 together.

FIG. 2 shows an alternate embodiment of a bolt together trailer frame 10 for use with sprung axles. The basic trailer frame 10 consists of a plurality of framing members attached to one another using fasteners. Two sides, which consist of one or more frame members 11, are fastened to a sprung axle support box 60. For some trailer designs, two end members 12, 13 are attached to the frame members 11. At the front end of the trailer frame 10, two tongue members 14 are attached to the axle frame members 11 and the front end member 12, if present, thereby forming the trailer tongue. The sprung axle support box 60 is typically located in a center portion of the trailer frame 10. Depending upon the intended weight distribution of the trailer, the sprung axle support box 60 is typically positioned to the rear of the center of the trailer frame.

Figure 11:
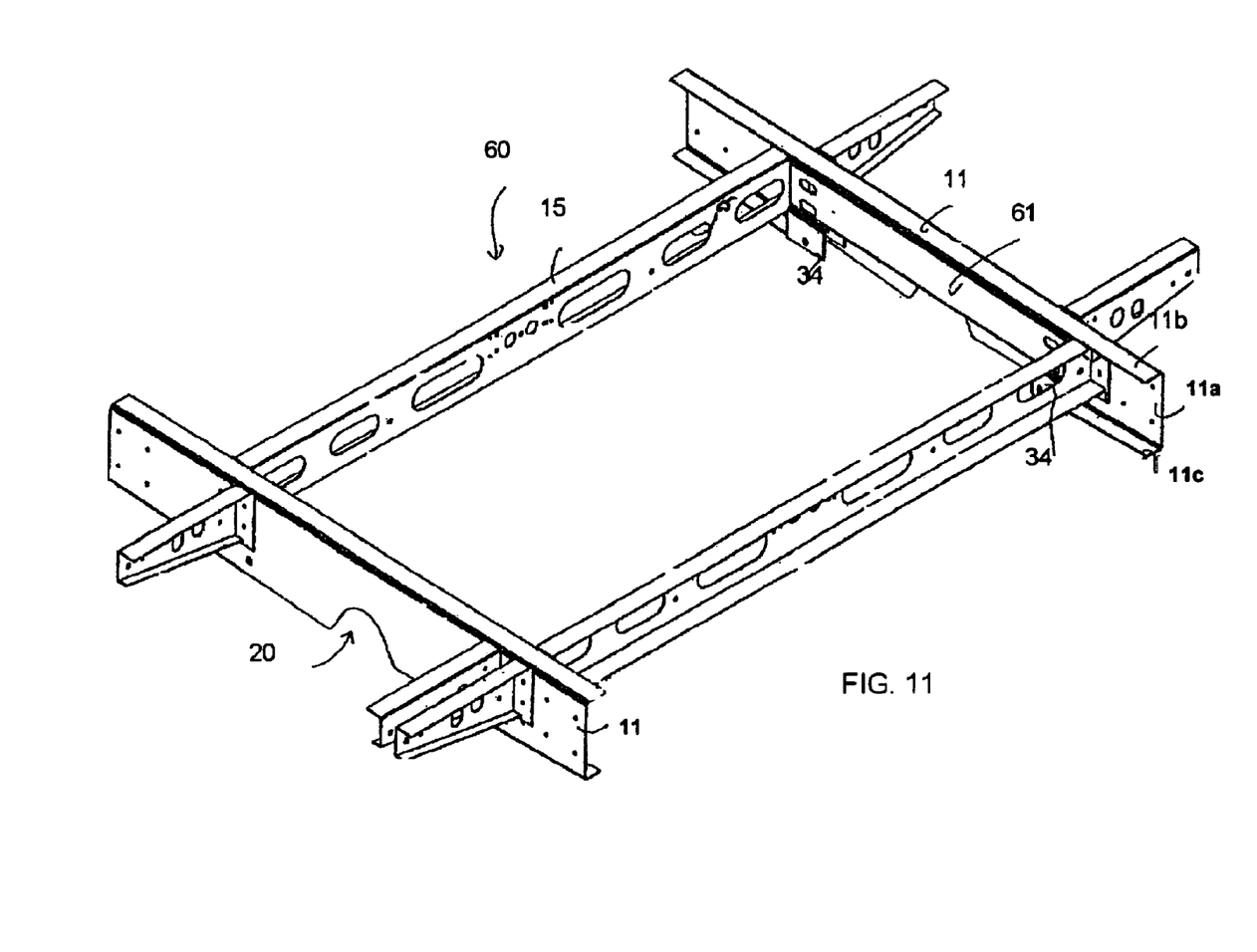
FIG. 11 is an enlarged perspective view of the sprung axle support box portion of the trailer frame shown in FIG. 2.

FIG. 11 shows a sprung axle support box 60 for a single axle trailer frame.

FIG. 2 shows the sprung axle support box 60 for a double axle trailer frame. The sprung axle support box 60 is essentially the same for both single axle trailer frames and double axle trailer frames. The primary differences are the length of the stiffener plates 61 and the number of spring hangers 34.

Figure 12:
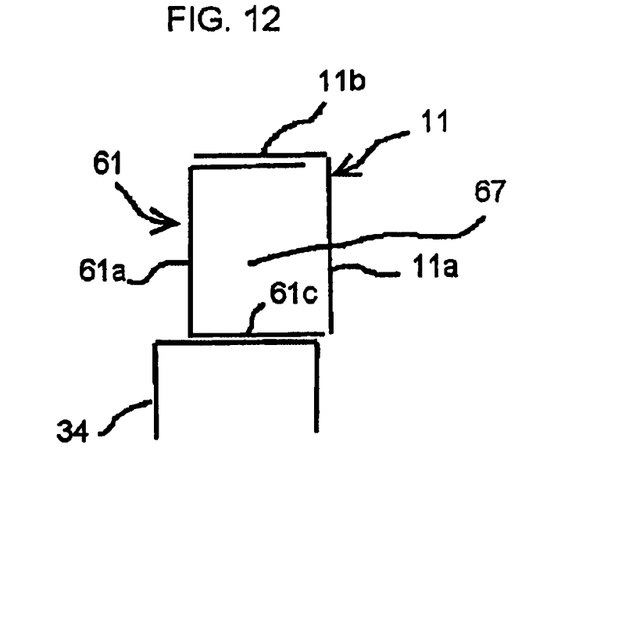
FIG. 12 is a cross-sectional view of an axle frame member, stiffener plate and spring hanger.

The first component of the sprung axle support box is the side box 67 (shown in FIG. 12), which is formed by welding a stiffener plate 61 to the portion of the axle frame member 11 adjacent the axle 37. In this embodiment, the axle frame member 11 is formed with a "C" shape having a vertically extending side flange or portion 11a with top 11b and bottom 11c portions extending away from the side portion 11a. The side 11a, top 11b and bottom 11c portions forming the "C" shape. The bottom portion 11c is not provided in the part of the axle frame member 11 which forms the sprung axle support box 60, as shown in FIGS. 11 and 12. The stiffener plate 61 also has a "C" shape, being formed with a vertically extending side portion 61a and top 61b and bottom 61c portions extending away the side portion 61a and towards the side member side portion 11a. Stiffener plate 61 is preferably welded to the axle frame member 11, whereby axle frame member top and side portions 11b, 11a, and stiffener plate top, bottom and side portions 61b, 61c, 61a form the enclosed side box 67.

The second component of the sprung axle support box 60 are the two cross members 15. The sprung axle support box cross members 15 are positioned adjacent to the spring hangers 48, with the front cross member 15 being positioned in front of the front most spring hanger 34 and the rear cross member 15 being positioned to the rear of the rear most spring hanger 34. Preferably, cross members 34 have a "C" shape like axle frame members 11. As needed, cross members 15 can have a plurality of weight reducing cutouts 65. Preferably, stiffener plates 61 have no weight reducing cutouts. Preferably cross members 15 extend from one axle frame member 11 to the opposite axle frame members, as shown in FIG. 2. However, cross members 15 could extend only partway towards the opposite axle frame member 11, as described above.

Figure 14:
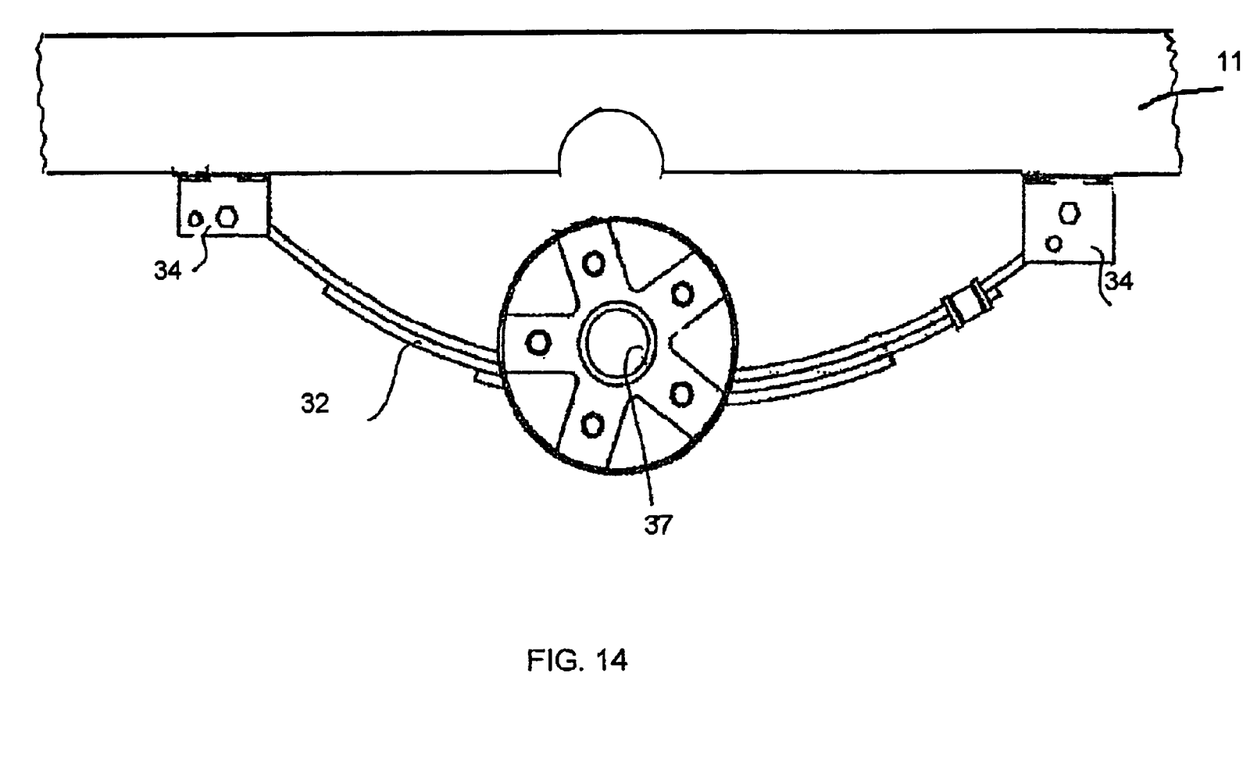
FIG. 14 is an enlarged partial side view of the trailer frame shown in FIG. 2 showing the sprung axle and spring member.

A plurality of spring hangers 34 are attached to the sprung axle support box 60. For a single axle trailer frame, two spring hangers 34 are attached to each axle frame member 11, as shown in FIG. 11. For a double axle trailer frame, three spring hangers 34 are attached to each axle frame member 11, as shown in FIGS. 2 and 4. Leaf springs 32 are attached to the spring hangers 34 as shown in FIG. 14. An axle 37 is attached to the middle of the leaf springs 32. The spring hangers 34 are preferably welded to the bottom portion 61c of the stiffener plate 61. Also, preferably, the leaf springs 32 are attached to the spring hangers 34 by fasteners, which extend through both side of the spring hangers 34 and adjacent the axle frame member 11. If needed, the spring hanger 34 could also be welded to the axle frame member 11.

Figure 13:
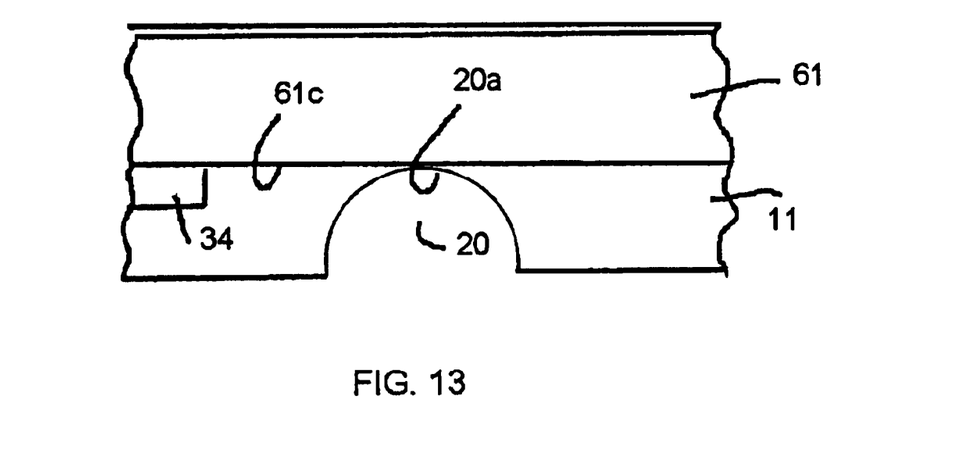
FIG. 13 is a partial side view of an axle frame member, illustrating the axle cutout and stiffener plate.

As shown in FIG. 13, an axle cutout 20 is provided in each axle frame member 11 for each axle 37. Preferably, the bottom portion 61c of the stiffener plate 61 does not extend below the uppermost point 20a of the axle cutout 20. In both embodiments, an axle cut-out reinforcement 22, 61 is attached to the axle frame member 11, proximate the axle cut-out 20.

What is claimed is:

1. In a bolt-together trailer frame having a plurality of frame members bolted together, wherein the improvement comprises:
    at least two axle frame members, each axle frame member having at least one axle cut-out in a lower portion thereof;
    at least one cut-out reinforcing member proximate the at least one axle cut-out; and
    at least one axle member, the at least one axle member comprising one of: at least one torsion axle integral with two cut-out reinforcing members; and at least one sprung axle unit,
    each sprung axle unit comprising: a plurality of spring hangers attached to the at least one axle frame member; leaf springs attached to the spring hangers; and an axle attached to the leaf springs.

2. The improvement according to claim 1, wherein the at least one axle member is a sprung axle unit, the number of sprung axle units is two, the number of axle cut-outs is four, the leaf springs comprise four sets of leaf springs, and the spring hangers comprise four end spring hangers and two pivotable equalizer spring hangers, each set of leaf springs being attached to one end spring hanger and one pivotable equalizer spring hanger, a pivotable equalizer spring hanger being positioned between two end spring hangers.

3. The improvement according to claim 2, wherein the number of axle frame members is four, two axle frame members being bolted to one another, and further comprising: at least one connector reinforcing member attached to each of the two bolted together axle frame members,
    each pivotable equalizer being attached to one of the at least one connector reinforcing members.

4. The improvement according to claim 1, further comprising:
    a plurality of cross supports attached to and extending laterally from the at least two axle frame members.

5. The improvement according to claim 4, wherein the laterally extending cross supports extend to and are attached to a corresponding laterally spaced axle frame member.

6. The improvement according to claim 4, wherein the laterally extending cross supports extend part way towards a corresponding laterally spaced axle frame member.

7. The improvement according to claim 6, wherein the laterally extending cross supports are adapted to be connected to a floor.

8. The improvement according to claim 1, wherein the at least one axle member is a torsion axle, the number of axle cut-outs is four and the number of torsion axles is two.

9. The improvement according to claim 1, wherein the number of axle frame members is four, two axle frame members being bolted to one another, and further comprising: at least one connector reinforcing member attached to each of the two bolted together axle frame members.

10. The improvement according to claim 9, wherein the number of connector reinforcing embers being attached to each of the two bolted together axle frame members is two, one of the at least one connector reinforcing members being attached to an outside surface of the bolted together axle frame members and one of the at least one connector reinforcing members being attached to an inside surface of the bolted together axle frame members.

11. The improvement according to claim 1, wherein the at least one axle member is a sprung axle unit and, further comprising: a spring hanger reinforcement gusset attached to the axle frame member between the axle frame member and the spring hanger.

12. The improvement according to claim 1, further comprising:
    a laterally extending flange about at least a portion of the axle cut-out.

13. The improvement according to claim 12, wherein the axle cut-out includes a top portion distal a lower edge of the axle frame member, the laterally extending flange being positioned about the top portion.

14. The improvement according to claim 1, wherein the axle frame member includes a plurality of dimples about the axle cut-out and the cut-out reinforcing member includes a corresponding plurality of dimples, the axle frame member dimples being in nested engagement with the cut-out reinforcing member dimples.

15. The improvement according to claim 14, wherein at least one of the cut-out reinforcing member dimples has an aperture therethrough and at least one of the axle frame member dimples has an aperture therethrough; and, further comprising:
    a threaded fastener extending through the apertures fastening the axle frame member and the cut-out reinforcing member together.

16. The improvement according to claim 1, wherein the cut-out reinforcing member is a plate positioned about the at least one axle cut-out.

17. The improvement according to claim 16, wherein the plate has a cut-out corresponding to the axle cut-out.

18. The improvement according to claim 1, wherein the cut-out reinforcing member is a longitudinally extending stiffener plate attached to the axle frame member.

19. The improvement according to claim 1, wherein the at least one axle member is a sprung axle unit; and further comprising:
a sprung axle support box connected to the at least two axle frame members, the sprung axle support box comprising: each axle frame member having a longitudinally extending stiffener plate attached thereto proximate the at least one axle cut-out; and two cross members connectedly attached to at least two axle frame members, each cross member being attached proximate an end of the stiffener plate.

20. The bolt-together trailer frame according to claim 19, wherein each stiffener plate is welded to an axle frame member.

21. The bolt-together trailer frame according to claim 19, wherein each axle frame member has a vertically extending side portion and a top portion extending at a 90° angle away from a top edge of the side portion.

22. The bolt-together trailer frame according to claim 21, wherein each stiffener plate has a vertically extending side portion and top and bottom portions extending at a 90° angle away from top and bottom edges of the side portion, the top and bottom portions extending in the same direction whereby the top, bottom and side portions form a C shape, the stiffener plate top and bottom portions extending towards an adjacent axle frame member side portion thereby forming an enclosed space having a top, bottom and two sides.

23. The bolt-together trailer frame according to claim 22, wherein the vertical height of the axle frame member side portion is greater than the vertical height of the stiffener plate side portion.

24. The bolt-together trailer frame according to claim 22, wherein the spring hangers are attached to the stiffener plate bottom portion.

25. In a bolt-together trailer frame having a plurality of frame members bolted together, wherein the improvement comprises:
at least two axle frame members, each axle frame member having at least one axle cut-out in a lower portion thereof, a laterally extending flange about at least a portion of the axle cut-out, a plurality of through apertures about the axle cut-out, a dimple positioned about at least one of the through apertures;
at least one cut-out reinforcing member about the at least one axle cut-out and fastened to an axle frame member, the cut-out reinforcing member having a plurality of apertures therein and a dimple positioned about at least one of the axle cut-out apertures, the cut-out reinforcing member dimples being in nested engagement with the axle cut-out dimples; and at least one axle member attached to the axle frame members.

26. The improvement according to claim 25, wherein the at least one axle member is at least one torsion axle, each torsion axle being integral with two cut-out reinforcing members.

27. The improvement according to claim 26, wherein each torsion axle is welded to the two cut-out reinforcing members.

28. The improvement according to claim 25, wherein the at least one axle member is at least one sprung axle unit, each sprung axle unit comprising: a plurality of spring hangers attached to the at least one axle frame member; leaf springs attached to the spring hangers; and an axle attached to the leaf springs.

29. A method of assembling a bolt-together trailer frame comprising:
providing a plurality of frame members including at least two axle frame members, each axle frame member having at least one axle cut-out therein;
selecting at least one axle member to fit the intended use of the bolt-together trailer frame, the selection being one of: a torsion axle and a sprung axle;
fastening the plurality of frame members together with a plurality of threaded connectors;
fastening an axle cut-out reinforcing member about each axle cut-out; and
attaching at least one axle member to the axle frame members.

30. The method according to claim 29, wherein the at least one axle member is a torsion axle; and further comprising:
welding the torsion axle to the axle cut-out reinforcing member.

31. The method according to claim 29, wherein the at least one axle member is a sprung axle unit comprising: a plurality of spring hangers, leaf springs and an axle and further comprising:
attaching the spring hangers to the axle frame members;
attaching the leaf springs to the spring hangers; and
attaching the axle to the leaf springs.

32. The method according to claim 31, further comprising:
fastening a plurality of transversally extending cross-support members with threaded connectors to the axle frame members.

33. The method according to claim 29, wherein the axle member has a plurality of dimples therein and the cut-out reinforcing member has a plurality dimples therein, and further comprising:
prior to the step of attaching the cut-out reinforcing member to the axle member, nesting the cut-out reinforcing member dimples and the axle member dimples together.

34. The method according to claim 29, further comprising:
providing an external reinforcing connector;
providing an internal reinforcing connector;
positioning two axle frame members end to end;
positioning the external reinforcing connector across the ends of both axle frame members on an external surface of the axle frame members;
positioning the internal reinforcing connector across the ends of both axle frame members on an internal surface of the axle frame members; and
fastening the external reinforcing connector, the internal reinforcing connector and the two axle frame members together with threaded fasteners.

35. A bolt-together trailer frame comprising:
a plurality of frame members connected together by a plurality of fasteners to form a trailer frame,
the plurality of frame members including at least two axle frame members adapted to be connected to either a torsion axle or a sprung axle, wherein the adaptation of the at least one axle frame member includes each axle frame having at least one axle cut-out therein; and at least one cut-out reinforcing member about the at least one axle cut-out, the cut-out reinforcing member being threadedly connected to the axle frame member.

36. The bolt-together trailer frame according to claim 35, wherein the adaptation of the at least one axle frame members further includes a laterally inwardly extending flange about at least a portion of the axle cut-out.

37. The bolt-together trailer frame according to claim 35, wherein the cut-out reinforcing member is a plate positioned about the at least one axle cut-out.

38. The bolt-together trailer frame according to claim 37, wherein the plate has a cut-out corresponding to the axle cut-out.

39. The bolt-together trailer frame according to claim 35, wherein the cut-out reinforcing plate is a longitudinally extending stiffener plate attached to the axle frame member.

40. In a bolt-together trailer frame having a plurality of frame members bolted together, wherein the improvement comprises:

at least two axle frame members, each axle frame member having at least one axle cut-out in a lower portion thereof;

at least one cut-out reinforcing member attached to each axle frame member with threaded fasteners about the at least one axle cut-out; and at least one axle member attached to the at least two axle frame members with threaded fasteners.

41. The improvement according to claim 40, wherein the at least one axle member is a torsion axle integral with two cut-out reinforcing members.

42. The improvement according to claim 40, wherein the at least one axle member is a sprung axle unit, the sprung axle unit comprising: a plurality of spring hangers attached to the at least one axle frame member; leaf springs attached to the spring hangers; and an axle attached to the leaf springs.

* * * * *